Aug. 10, 1948.    F. D. VEZZOSI    2,446,564
CLAMPING DEVICE
Filed Dec. 19, 1944

INVENTOR.
FERDINAND D. VEZZOSI
BY
William D. Hall.
ATTORNEY

Patented Aug. 10, 1948

2,446,564

UNITED STATES PATENT OFFICE 2,446,564

CLAMPING DEVICE

Ferdinand D. Vezzosi, Newark, N. J., assignor to the United States of America as represented by the Secretary of War Application December 19, 1944, Serial No. 568,919

4 Claims. (Cl. 248—361)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to clamping devices and more particularly to such devices for firmly holding electronic tubes and the like in position and protecting them against injury.

The need for holding tubes firmly in their sockets and against lateral vibration during transportation and in vehicular installations has long been recognized. The conventional method of simply plugging tubes into their sockets without other support is unsatisfactory. The continuous jarring of the tubes, especially in sets installed in moving vehicles, tends to loosen the glass envelopes of the tubes from their bases. Also, where tubes are necessarily mounted in close proximity to each other or to other equipment they tend to jar against each other or said equipment and break. It has also been found that tubes tend to vibrate loose from their sockets. Frequent and costly breakdowns result from these conditions.

It is an object of this invention to prevent the envelope of a tube from vibrating or jarring loose from its base.

It is a further object of this invention to provide a means whereby the position of a tube relative to its socket will at all times be constant.

It is a further object of this invention to provide a means whereby a tube shall be prevented from vibrating in its socket.

It is another object of this invention to provide a means whereby adjacent tubes shall be prevented from vibrating or jarring against each other.

It is also an object of this invention to provide a means whereby the glass envelope of the tube is held in proper position relative to its base during changes in temperature so that contact between said envelope and said base is not disturbed.

It is also an object of this invention to provide a means that shall be inexpensive and simple to manufacture.

It is another object to provide a means of the foregoing type that shall be adjustable to a plurality of positions, that does not occupy otherwise useful space and that shall be readily movable so as not to impede the insertion or removal of the tubes to be held.

I have solved the problem of preventing tubes from vibrating due to jarring of the equipment in which they are mounted by providing the upper portion of the tubes with a support that is supported by the base panel on which the tubes are mounted. Thus, any movement of the base panel will be transmitted directly to the tube, at its base through the socket and at its top through the clamp, thereby preventing the tube from moving and vibrating independently of the base panel.

Although this description is specifically directed to the support of tubes, it is not to be so limited, but the invention must be understood to include other types of socketed apparatus.

For a better understanding of this invention, reference is made to the accompanying description read in connection with the accompanying drawings.

Figure 1:
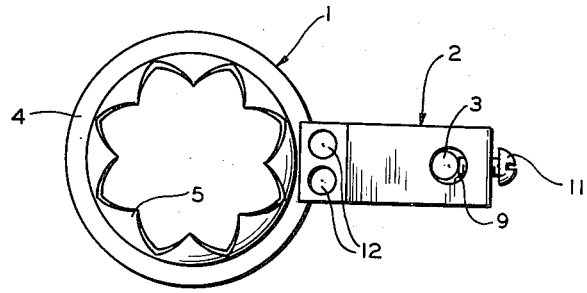
Figure 1 is a top view of one embodiment of my invention.
Figure 2:
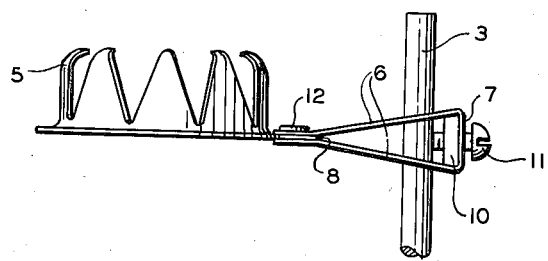
Figure 2 is an elevational view of this embodiment.
Figure 3:
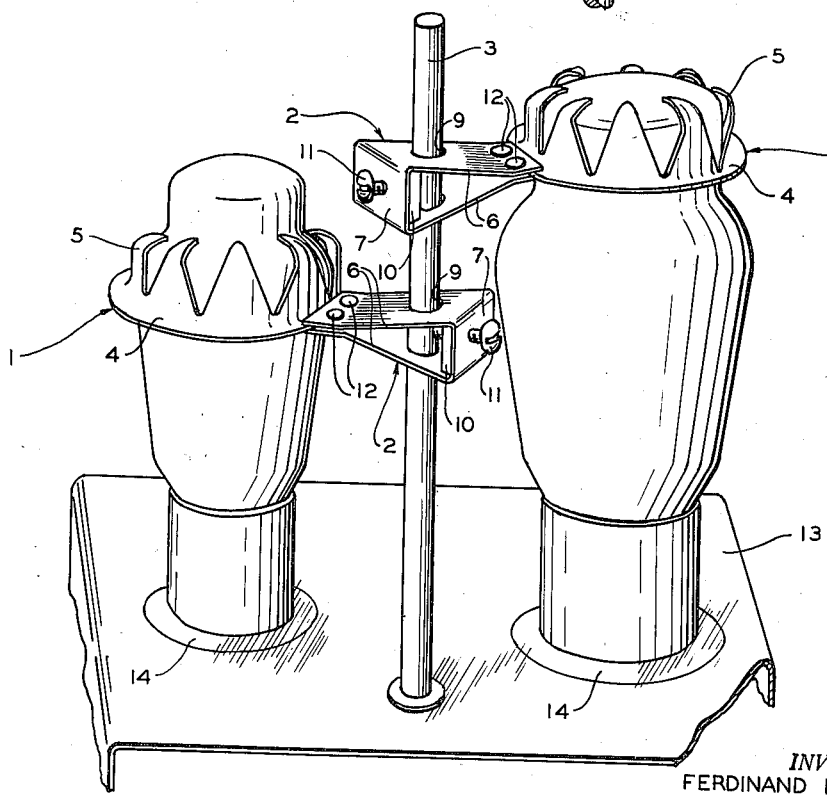
Figure 3 is a perspective view showing two of said clamping devices utilizing a single rod and holding two tubes of different sizes.

Referring to the drawings, in which like numbers refer to like elements, the embodiment there illustrated is seen to consist of a crown 1, a connecting member 2 and a rod 3.

The crown 1 comprises a flat annular element 4, provided on its internal periphery with a plurality of upwardly and then inwardly extending fingers 5, and having a lip 8 extending outwardly at one part of its outer periphery. The internal periphery of annular element 4 is designed to be of proper dimension to fit snugly about the upper part of the envelope of the tube to be supported. The inwardly extending part of the fingers 5 is designed to be of sufficient size to firmly grasp the top surface of the tube when a downward pressure is exerted on the top of the tube by said inwardly extending parts, as will be explained hereinafter.

The connecting member 2 consists of two arms 6 and wall 7, which together form a triangle. The arms 6 meet at one end and extend respectively above and below the lip 8 to which they are secured by rivets 12.

A nut 10 is positioned against the interior face of the wall 7 and is held in place by a screw 11, which screw passes through an aperture in the wall 7. The arms 6, proximate to the nut 10, are provided with rod apertures 9, positioned just beyond the nut 10, which apertures are in register, so as to be slideably receivable to a rod 3.

The rod 3 is firmly mounted in a base panel 13 of the apparatus and extends upward substantially parallel to the axis of a tube mounted in a socket 14 supported by said panel. The axis of the rod is spaced from the axis of the tube by a distance equal to the distance between the axes of a rod aperture 9 and the annular element 4.

In operation, the crown 1 is moved downward around the top of the tube to be supported until the inwardly projecting parts of the fingers 5 press firmly against the top of the tube envelope or a shoulder portion of the said envelope. The assembly is then held in place by tightening the screw 11 against the rod 3.

In this embodiment of my invention, it is intended that connecting member 2 and fingers 5 shall preferably be somewhat resilient. The invention, however, is not to be so limited as the clamp will operate if said parts are rigid.

I have thus disclosed a simple means whereby a tube may be prevented from moving independently of the movement of the set in which it is mounted. The annular element 4 and the upwardly projecting parts of the fingers 5 prevent independent lateral vibration by exerting pressure against a lateral surface of said tube and the inwardly extending parts of the fingers 5 prevent the tube from loosening upwardly in its socket by exerting pressure against a transverse area of said tube.

While one illustrative embodiment of the present invention has been described, it will be obvious that various modifications may be made without departing from the spirit of the invention.

What is claimed is:

1. The combination of a chassis member, an electronic tube socket mounted on said chassis member, a rod-like support extending from the chassis substantially parallel to the tube socket, a ring-like member for clamping the tube, and means carried by the rod for engaging and holding the periphery of the ring member, said ring member having a plurality of radially extending fingers for engaging a tube, said fingers having both lateral and transverse engaging portions complementary in shape to said tube whereby lateral and longitudinal displacement of said tube is prevented.

2. A tube clamping device for retaining a tube in a socket comprising the combination of a rod rigidly mounted relative to said socket and with its axis substantially parallel to the axis of a tube mounted in said socket, a substantially annular member provided on its inner periphery with a plurality of upwardly and then inwardly projecting fingers, said upwardly projecting portion of said fingers being adapted to exert pressure against the sides of the tube and said inwardly projecting portion of said fingers being adapted to exert pressure against a transverse area of said tube whereby both lateral vibration and longitudinal displacement of the tube in the socket is prevented, and means for adjustably connecting said annular element to said rod.

3. A tube clamping device for retaining a tube in a socket, comprising a rod adapted to be connected to a chassis, a clamping element slidable on said rod, and means to retain said clamping element in a fixed position on said rod, said clamping element comprising an annular element adapted to exert both a lateral and a downward pressure on a tube in said chassis so as to prevent lateral and longitudinal displacement thereof, wherein said annular member comprises a plurality of radially disposed spring fingers having longitudinal and transverse elements complementary in shape to the tube engaged by said clamping member.

4. The combination, with a tube having a lateral surface and a transverse surface, of a clamping device having spring fingers, the said fingers having upwardly extending portions complementary in shape to the lateral surface of said tube and having inwardly extending portions complementary in shape to the transverse surface of said tube, whereby the tube may be resiliently held against lateral vibration and longitudinal displacement.

FERDINAND D. VEZZOSI.

REFERENCES CITED

The following references are of record in the file of this patent:

UNITED STATES PATENTS

| Number | Name | Date |
| --- | --- | --- |
| 2,140,443 | Clark | Dec. 13, 1938 |
| 2,125,843 | Hall | Aug. 2, 1938 |
| 2,202,265 | Phillips | May 28, 1940 |
| 2,382,428 | Leuvelink | Aug. 14, 1945 |
| 2,388,650 | Whittel et al. | Nov. 6, 1945 |